(12) United States Patent
Ding et al.

(10) Patent No.: US 12,022,556 B2
(45) Date of Patent: Jun. 25, 2024

(54) MAINTAINING SIDELINK (SL) CONNECTIVITY FOR SL CONFIGURED WITH DISCONTINUOUS RECEPTION (DRX)

(71) Applicant: QUALCOMM Incorporated, San Diego, CA (US)

(72) Inventors: Ling Ding, Chester, NJ (US); Junyi Li, Franklin Park, NJ (US); Sony Akkarakaran, Poway, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/165,528

(22) Filed: Feb. 2, 2021

(65) Prior Publication Data

US 2021/0274588 A1   Sep. 2, 2021

Related U.S. Application Data

(60) Provisional application No. 62/983,122, filed on Feb. 28, 2020.

(51) Int. Cl.
*H04W 76/28* (2018.01)
*H04L 5/00* (2006.01)

(52) U.S. Cl.
CPC ........... *H04W 76/28* (2018.02); *H04L 5/0048* (2013.01)

(58) Field of Classification Search
CPC ............... H04W 76/28; H04W 64/003; H04W 52/0245; H04W 76/25; H04W 88/04; H04W 52/0241; H04W 52/0229; H04W 52/0216; H04W 8/005; H04L 5/0048; H04L 5/0053; Y02D 30/70
See application file for complete search history.

(56) References Cited

U.S. PATENT DOCUMENTS

| | | | | |
|---|---|---|---|---|
| 2013/0150076 A1* | 6/2013 | Kim | ..................... | G01C 21/165 455/456.1 |
| 2013/0229930 A1* | 9/2013 | Akay | .................... | H04W 12/64 370/252 |
| 2014/0266708 A1* | 9/2014 | Warren | .............. | G08B 21/0269 340/539.13 |
| 2014/0321416 A1* | 10/2014 | Pragada | ................ | H04W 76/28 370/329 |

(Continued)

FOREIGN PATENT DOCUMENTS

| | | |
|---|---|---|
| WO | 2018016882 A1 | 1/2018 |
| WO | 2018064179 A1 | 4/2018 |

OTHER PUBLICATIONS

International Search Report and Written Opinion—PCT/US2021/016466—ISA/EPO—dated May 18, 2021.

*Primary Examiner* — Ian N Moore
*Assistant Examiner* — Sun Jong Kim
(74) *Attorney, Agent, or Firm* — Patterson & Sheridan, L.L.P/Qualcomm Incorporated

(57) ABSTRACT

Methods and apparatus for wireless communication by a first user-equipment (UE). The method generally includes monitoring for signaling from a second UE during a DRX cycle associated with a DRX configuration for at least one of the first UE or the second UE, determining whether the first UE and the second UE are within range for communication based on the monitoring, and taking one or more actions based on the determination.

17 Claims, 8 Drawing Sheets

(56) References Cited

U.S. PATENT DOCUMENTS

| | | | |
|---|---|---|---|
| 2015/0004975 A1* | 1/2015 | Yamamoto | H04W 36/24 |
| | | | 455/436 |
| 2015/0119056 A1* | 4/2015 | Lee | H04W 56/001 |
| | | | 455/450 |
| 2016/0044740 A1 | 2/2016 | Siomina et al. | |
| 2016/0191913 A1* | 6/2016 | Martch | H04N 21/25841 |
| | | | 348/189 |
| 2018/0054745 A1* | 2/2018 | Wu | H04W 72/1273 |
| 2018/0309496 A1* | 10/2018 | Lee | H04L 5/0044 |
| 2019/0037605 A1 | 1/2019 | Agiwal et al. | |
| 2019/0053305 A1* | 2/2019 | Saiwai | H04W 76/11 |
| 2020/0053824 A1* | 2/2020 | He | H04L 5/0048 |
| 2020/0267690 A1* | 8/2020 | Hsieh | H04W 76/28 |
| 2021/0068101 A1* | 3/2021 | Chen | H04L 1/0061 |
| 2022/0287128 A1* | 9/2022 | Shin | H04L 5/0055 |

* cited by examiner

MAINTAINING SIDELINK (SL) CONNECTIVITY FOR SL CONFIGURED WITH DISCONTINUOUS RECEPTION (DRX)

CROSS-REFERENCE TO RELATED APPLICATION

This application claims benefit of and priority to U.S. Provisional Application No. 62/983,122, filed Feb. 28, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communication techniques.

Certain aspects provide a method for wireless communication by a first user-equipment (UE). The method generally includes monitoring for signaling from a second UE during a discontinuous reception (DRX) cycle associated with a DRX configuration for at least one of the first UE or the second UE, determining whether the first UE and the second UE are within range for communication based on the monitoring, and taking one or more actions based on the determination.

Certain aspects provide a method for wireless communication by a first UE. The method generally includes generating signaling to be used for determination of whether the first UE and the second UE are within range for communication, and transmitting the signaling to a second UE during a DRX cycle associated with a DRX configuration of at least one of the first UE or the second UE.

Certain aspects provide an apparatus for wireless communication by a first UE. The apparatus generally includes a memory, and one or more processors coupled to the memory, the one or more processors and the memory being configured to: monitor for signaling from a second UE during a DRX cycle associated with a DRX configuration of at least one of the first UE or the second UE; determine whether the first UE and the second UE are within range for communication based on the monitoring; and take one or more actions based on the determination.

Certain aspects provide an apparatus for wireless communication by a first UE. The apparatus generally includes a memory, and one or more processors coupled to the memory, the one or more processors and the memory being configured to: generate signaling to be used for determination of whether the first UE and a second UE are within range for communication; and transmit the signaling to the second UE during a DRX cycle associated with a DRX configuration of at least one of the first UE or the second UE.

Certain aspects provide an apparatus for wireless communication by a first UE. The apparatus generally includes means for monitoring for signaling from a second UE during a DRX cycle associated with a DRX configuration for at least one of the first UE or the second UE, means for determining whether the first UE and the second UE are within range for communication based on the monitoring, and means for taking one or more actions based on the determination.

Certain aspects provide an apparatus for wireless communication by a first UE. The apparatus generally includes generating means for signaling to be used for determination of whether the first UE and the second UE are within range for communication, and means for transmitting the signaling to a second UE during a DRX cycle associated with a DRX configuration of at least one of the first UE or the second UE.

Certain aspects provide a computer-readable medium having instructions stored thereon to cause a first UE to monitor for signaling from a second UE during a DRX cycle associated with a DRX configuration for at least one of the first UE or the second UE, determine whether the first UE and the second UE are within range for communication based on the monitoring, and take one or more actions based on the determination.

Certain aspects provide a computer-readable medium having instructions stored thereon to cause a first UE to generate signaling to be used for determination of whether the first UE and the second UE are within range for communication, and transmit the signaling to a second UE during a DRX cycle associated with a DRX configuration of at least one of the first UE or the second UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for determining whether a user-equipment (UE) is within range of another UE for sidelink (SL) communication. One or more of the UEs may be operating in a discontinuous reception (DRX) mode of operations. Keep alive signaling may be transmitted by a transmit UE (Tx UE) periodically. A receiver UE (Rx UE) may receive the keep alive signaling, and determine whether the Tx UE is within communication range based on whether an energy level associated with the signaling is below a threshold.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
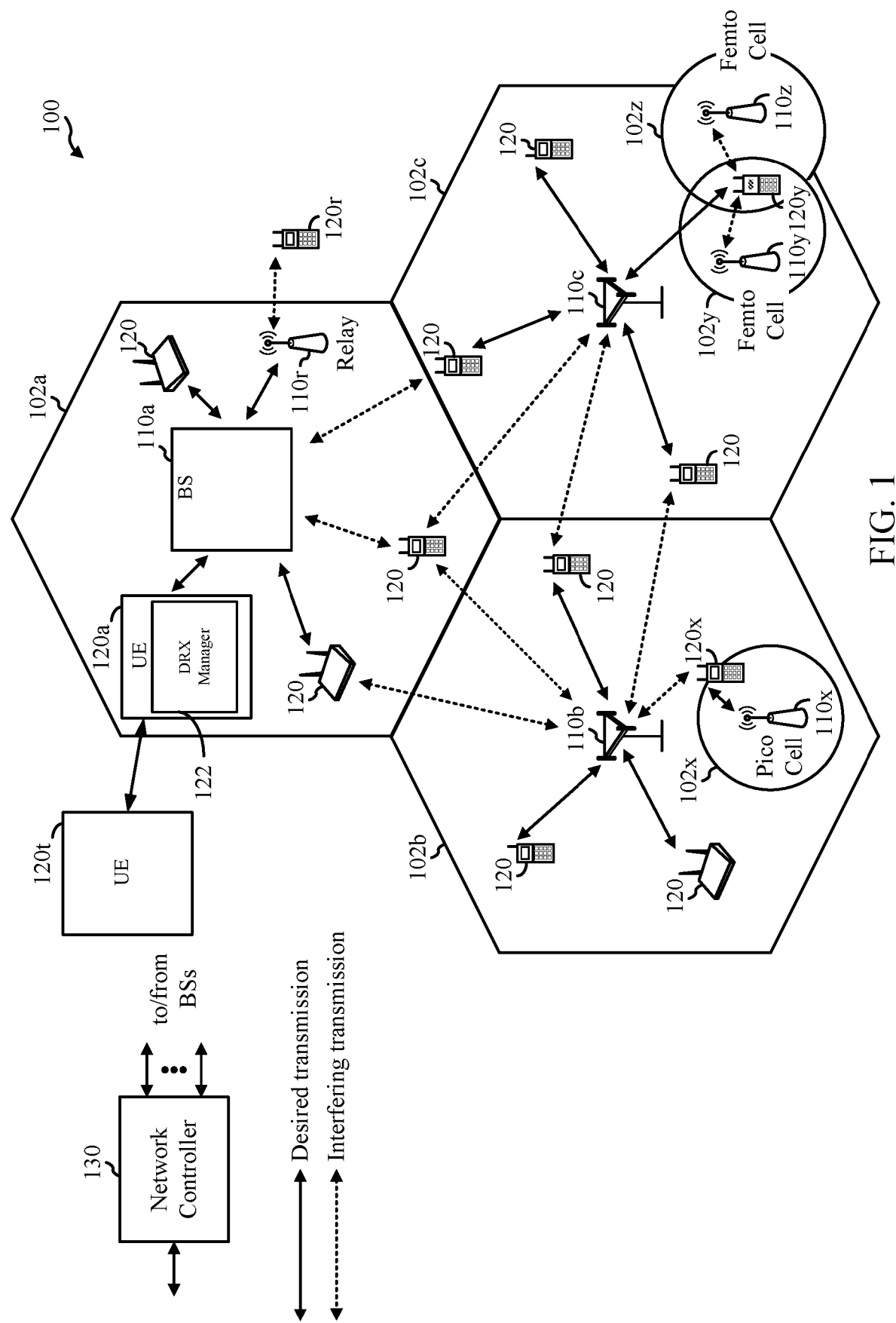
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to determining whether other UEs are within range for communication using SL configured with discontinuous reception (DRX). As shown in FIG. 1, the UE 120a includes a DRX manager 122. The DRX manager 122 may be configured to transmit or receive keep alive signaling, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
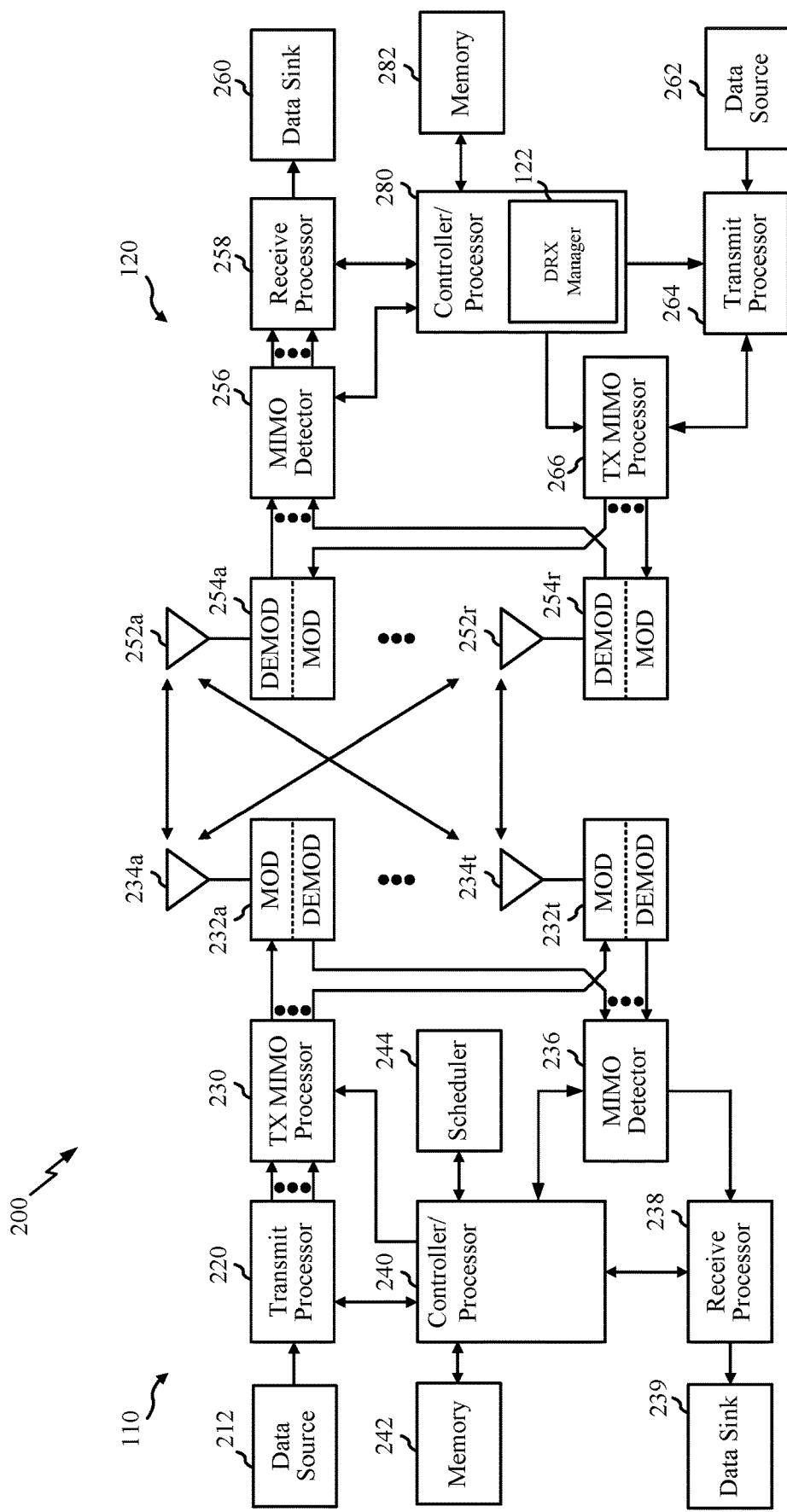
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the DRX manager 122. Although shown at the Controller/Processor, other components of the UE 120a may be used performing the operations described herein.

Figure 3B:
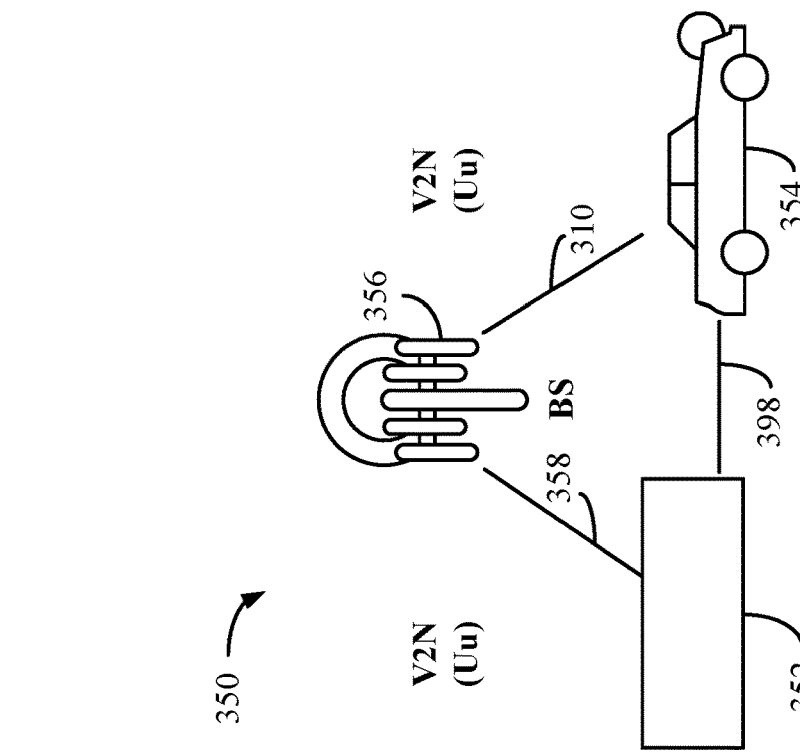
FIGS. 3A and 3B show diagrammatic representations of example vehicle to everything (V2X) systems in accordance with some aspects of the present disclosure.
Figure 3A:
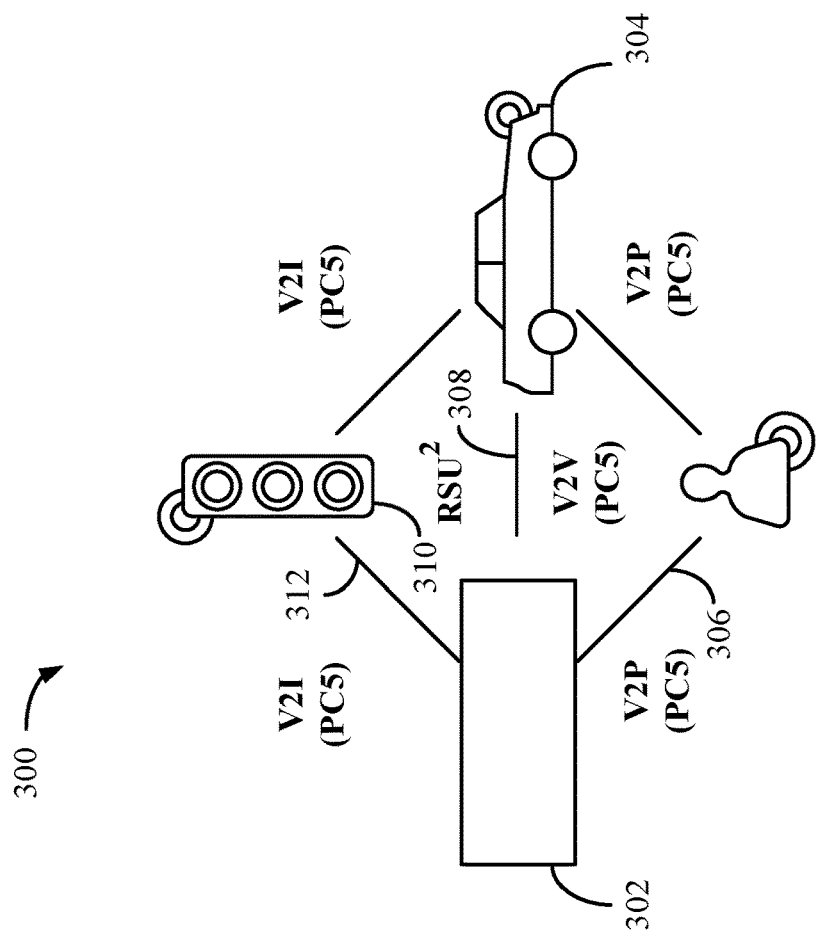

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Maintaining Sidelink (SL) Connectivity for SL Configured with Discontinuous Reception (DRX)

In a discontinuous reception (DRX) mode of operation, a UE may go into a low power ("sleep") mode (also referred to herein as a "sleep phase"), which may also be referred to as a low power state, for a certain period of time (referred to as a DRX OFF period, phase, or duration) and wakes up again during a DRX ON (e.g., awake phase) period to check if there is any data to be received. The cycle of sleep and wake-up (DRX ON and DRX OFF) periods repeats over time, allowing the UE to save power while maintaining communication.

Figure 4A:
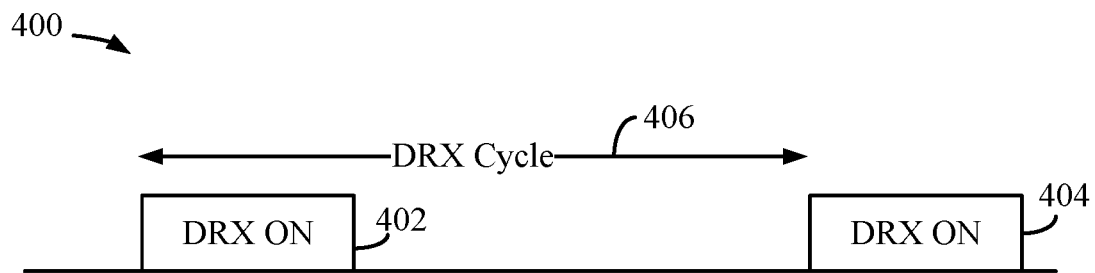
FIG. 4A illustrates an example discontinuous reception (DRX) configuration of a UE, in some aspects.

FIG. 4A illustrates an example DRX configuration 400 of a UE. As illustrated, the DRX configuration 400 may include DRX ON phases 402, 404. As described herein, a DRX ON phase repeats every DRX cycle. For example, the DRX ON phase 402 is during DRX cycle 406, as illustrated. The UE is awake during the DRX ON phases 402, 404 to monitor for signaling that may be received, and in a low power state (e.g., sleep phase) at other times (also referred to as DRX sleep phase).

In certain scenarios, a DRX configuration may be implemented for UEs in sidelink (SL) communication. For example, a first SL UE may be in communication with a second SL UE. Once the first SL UE enters a DRX ON phase, the first SL UE may be unaware of whether the second SL UE is still within range for communication. For a Uu link between a UE and base station (BS) (e.g., gNB), the BS is not mobile and sends synchronization signal blocks (SSBs) so that a UE can detect that the BS is in communication range (e.g., whether the UE is out of range of the BS or the BS is out of range of UE). However, for SL communication between first and second SL UEs, both UEs may be mobile, and a SL UE may not transmit SSBs for detection by another SL UE. A SL UE may act similar to a BS by sending SSBs, but this may be costly in term of power consumption, processing power, and impact to performance. Certain aspects of the present disclosure provide techniques for SL UEs to determine whether other SL UEs are within range for communication when at least one of the UEs is in a DRX mode of operation. The determination of whether SL UEs are within communication range may be based on keep alive signaling, as described in more detail herein.

Figure 4B:
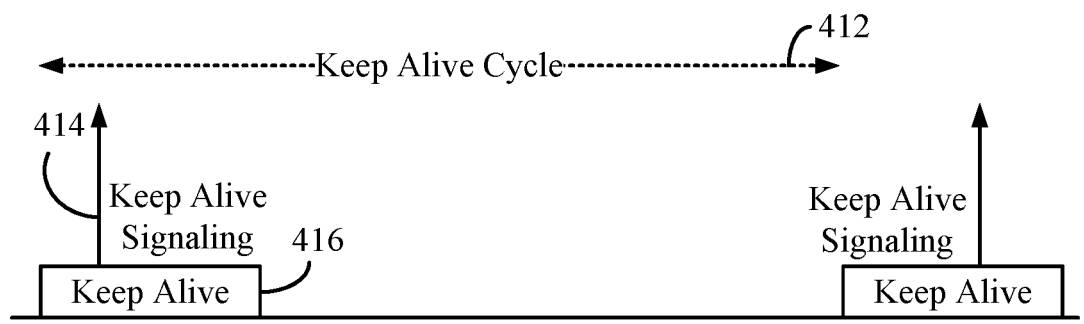
FIG. 4B illustrates a keep alive cycle, in accordance with certain aspect of the present disclosure.

FIG. 4B illustrates a keep alive cycle 412, in accordance with certain aspect of the present disclosure. The period associated with the keep alive cycle 412 may greater than a period associated with the DRX cycle 406. As illustrated, during the keep alive cycle 412, a keep alive occasion 416 may exist, during which keep alive signaling 414 may be transmitted by a TX UE. The keep alive signaling may be used by an RX UE to determine whether the RX UE and the TX UE are within range for communication. For example, an RX UE may determine whether an energy level of the keep alive signaling 414 is above a threshold, based on which the RX UE determines whether the TX UE is within range for communication.

Figure 5:
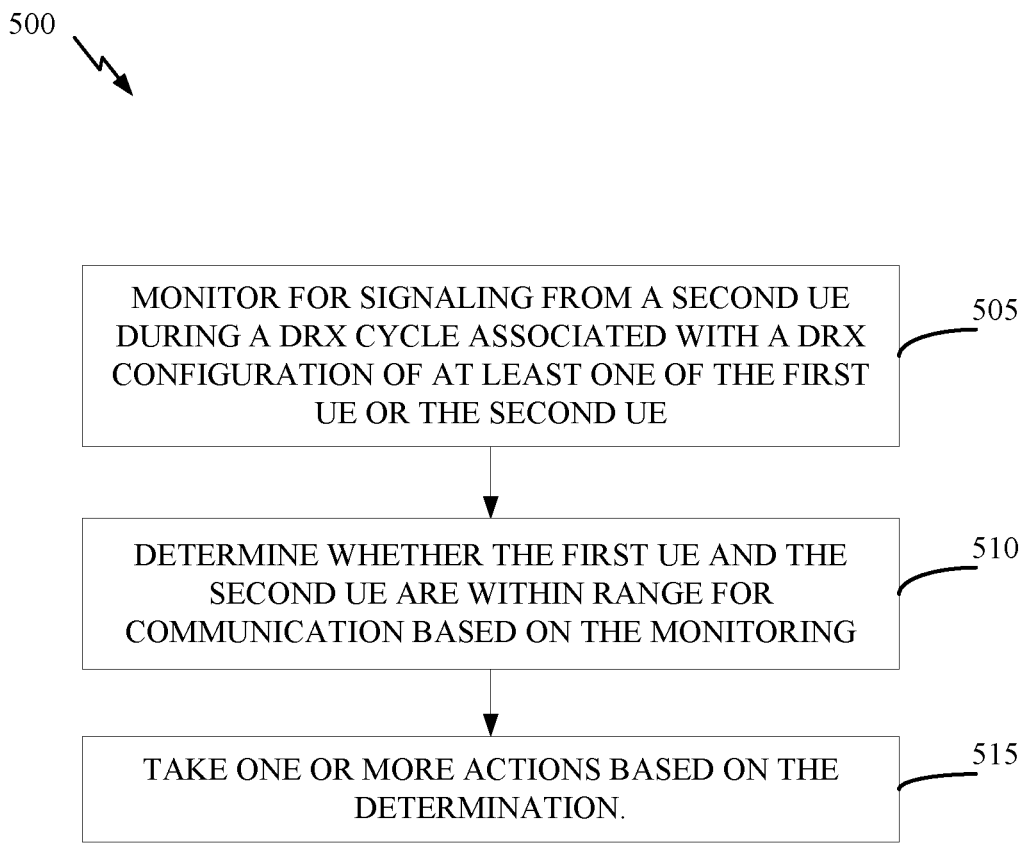
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a first UE (e.g., such as a UE 120a in the wireless communication network 100). The first UE with respect to the operations 500 may be referred to as a Rx UE.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the first UE monitoring for signaling (also referred to herein as a keep alive signal or signaling) from a second UE (e.g., a Tx UE) during a DRX cycle associated with a DRX configuration of at least one of the first UE or the second UE. In some aspects, the signaling may be monitored for if the DRX configuration is configured for the at least one of the first UE or the second UE.

At block 510, the first UE determines whether the first UE and the second UE are within range for communication based on the monitoring, and at block 515, takes one or more actions based on the determination. For example, if the first UE and the second UE are determined to be out of range, the first UE may report to the BS, as described in more detail herein.

In some aspects, the signaling is transmitted by the second UE during multiple periodic transmission occasions. The first UE may select how often to monitor for the signaling, the signaling being monitored for during one or more of the multiple periodic transmission occasions in accordance with the selection. For example, the selection of how often to monitor for the signaling may be based on an energy level associated with reception of the signaling during one of (e.g., a first or initial one) the multiple periodic transmission occasions.

Figure 6:
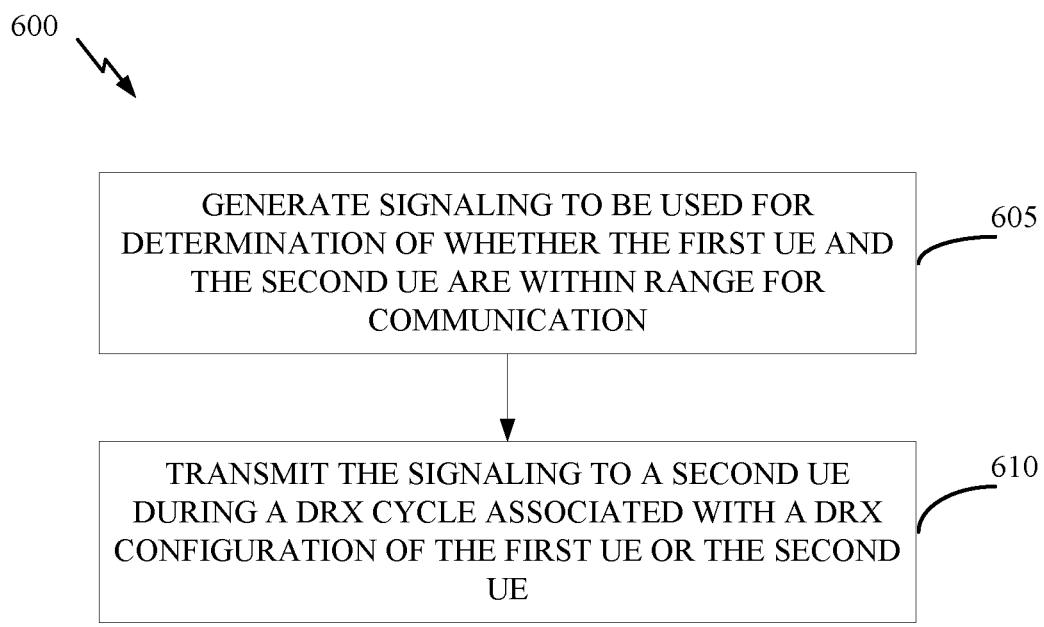
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a first UE (e.g., such as a UE 120t in the wireless communication network 100). The first UE with respect to the operations 600 may be referred to as a Tx UE.

Operations 600 may be implemented as software components that are executed and run on one or more processors (e.g., controller/processor 280 of FIG. 2). Further, the transmission and reception of signals by the first UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, by the first UE generating signaling (also referred to as a keep alive signal or signaling) to be used for determination of whether the first UE and the second UE are within range for communication. At block 610, the first UE may transmit the signaling to a second UE during a DRX cycle associated with a DRX configuration of at least one of the first UE or the second UE.

In other words, a SL Tx UE broadcasts (transmits) a keep alive signal over all directions periodically. The time and frequency resource (of broadcasting) may be configured per SL TX-RX pair. If one TX UE communicates with more than one RX UE, then a single keep alive signal from the TX UE may be sent to all the RX UEs. Moreover, the keep alive signal may be Tx centric. In other words, the keep alive signal may be unique from Tx UE viewpoint, and the time and frequency resource for transmission of the keep alive signal may be configured from Tx UE view point, as described in more detail herein.

Figure 7A:
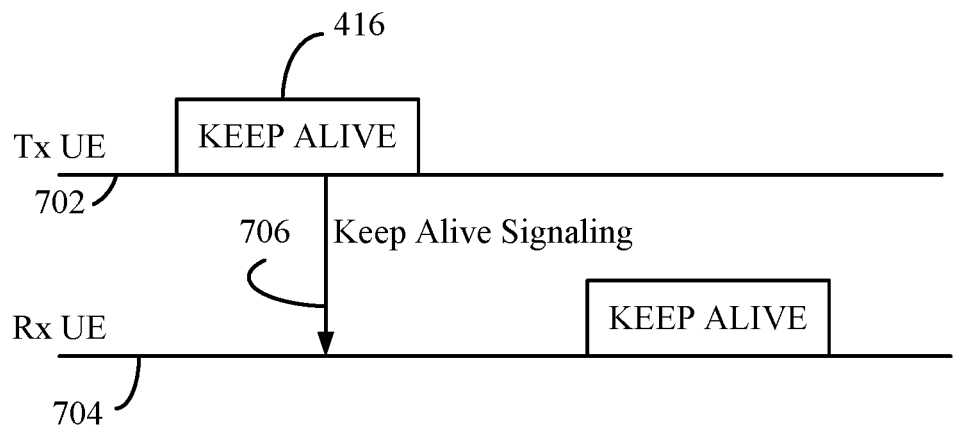
FIGS. 7A, 7B, and 7C illustrate transmissions of keep alive signaling between UEs, in accordance with certain aspects of the present disclosure.
Figure 7B:
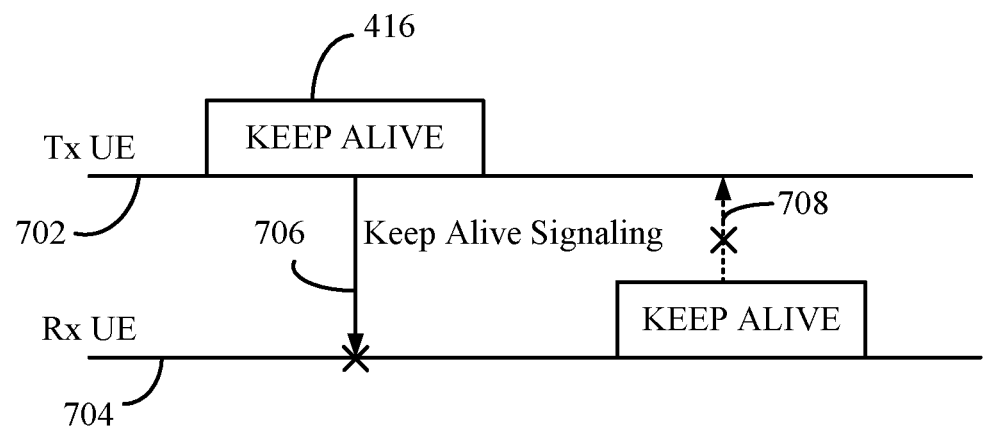
Figure 7C:
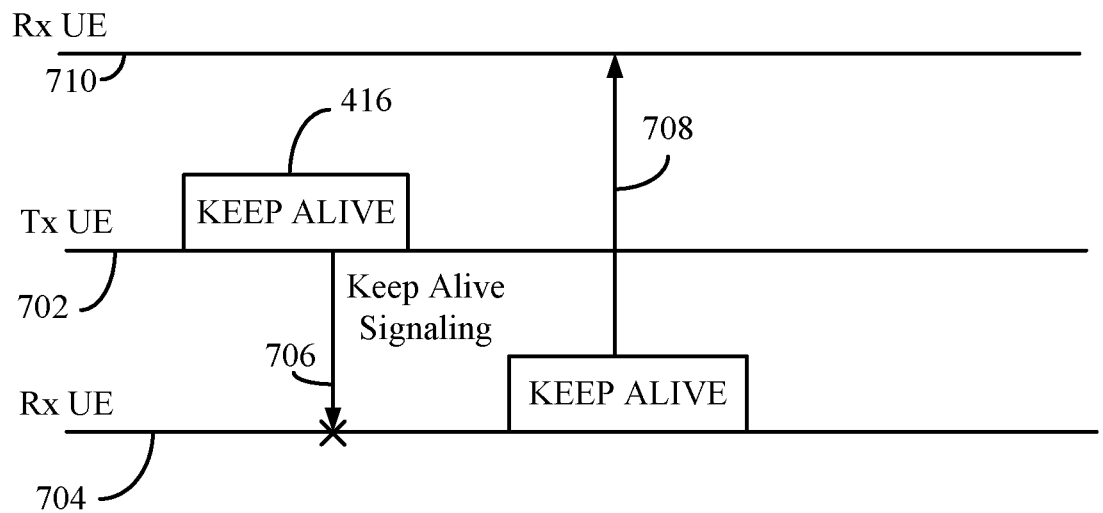

FIGS. 7A, 7B, and 7C illustrate transmissions of keep alive signaling 706 between a Tx UE 702 and an Rx UE 704, in accordance with certain aspects of the present disclosure. In certain aspects, the time of the keep alive signaling transmission may be configured independent of the Tx UE's DRX setting. In other words, the time location of the keep alive signaling may be configured independent of Tx UE's DRX setting (e.g., if the Tx UE is configured with DRX). During the time configured for the keep alive signaling, both TX UE and RX UE(s) have to be awake independent of TX/RX UE's DRX setting (e.g., if TX or RX UE is configured with DRX). As illustrated in FIG. 7A, the keep alive signaling transmission may be during the keep alive phase 402.

During the time configured for transmission of the keep alive signal, both the Tx UE and the Rx UE(s) may have to be awake in order to receive the signaling no matter whether the configured time falls into a DRX active time (sleep phase) of the TX UE or a DRX active time of the Rx UE(s). Both the Tx UE 702 and the Rx UE 704 have to be awake at the time when the keep alive signaling is transmitted. Having to be awake to transmit or receive the keep alive signaling should have little impact on UE power consumption due to the period of the keep alive signal being long. For example, depending on UE mobility, the keep alive signal may be transmitted once every few seconds (e.g., 10 seconds).

The keep alive signal may be a relatively light signal with respect to the amount of information the keep alive signal is used to communicate and how often the keep alive signal is transmitted. For example, the keep alive signal may be lighter than a SSB in that the keep alive signal is transmitted less frequently and has less information since, unlike an SSB, the keep alive signal may not include system and timing information. In other words, an SSB may include information associated with a primary synchronization signal (PSS), secondary synchronization signal (PSS), a physical broadcast channel (PBCH), which may not be included in a keep alive signal.

If a Rx UE 704 does not successfully receive the keep alive signal from a Tx UE 702 (e.g., one or more times), then the Rx UE 704 may conclude that the Tx UE 702 is out of range of the Rx UE 704. As used herein, the keep alive signal is considered to not be successfully received and indicates that the UE is out of range if an energy level associated with the signaling as detected by the Rx UE is below a threshold. For example, the Rx UE 704 may determine that the Tx UE 702 is not within communication range, and may report to the BS via a Uu link that the Tx UE 702 is out of range. In response, the BS may take one or more actions to facilitate communication between the UEs. For example, the BS may add a relay for communication between the UEs, or act as the relay itself (e.g., as described with respect to FIG. 3B).

A Tx UE 702 may use a broad beam or narrow beam for transmission of the keep alive signal. In some cases, the Tx UE may determine whether to transmit the keep alive signal using the broad beam or the narrow beam based on application type or configuration, or location estimation (e.g., location of the Tx UE and/or the Rx UE).

Certain aspects are directed to a periodicity of the keep alive signal transmission. For example, from the Tx UE perspective, the transmission of the keep alive signal may be in accordance with a fixed base-period by configuration. In other words, periodic transmission occasions of the keep alive signal may be in accordance with a fixed periodicity. From the Rx UE perspective, the monitoring of the keep alive signal may be adaptive. For example, the Rx UE may monitor for the keep alive signal during one or more base-periods. If a first keep alive signal from the Tx UE is received by the Rx UE with high energy, the Rx UE may begin to monitor for the keep alive signal less often, and vice versa.

The keep alive signal may include a known sequence (e.g., known by Tx UE and Rx UE) per SL Tx UE. For example, the keep alive signal may be similar to CSI-RS or a more generalized version of CSI-RS. In some aspects, the keep alive signal may be different from the CSI-RS transmitted by a BS on the Uu link. In Uu link, CSI-RS is used for determining channel state information. The channel state information may be used to determine a modulation and coding scheme (MCS). However, a keep alive signal may be used to know whether channel quality is below or above certain threshold. If channel quality is below the threshold, an Rx UE may determine that the Tx UE is out of range. Therefore, the resource allocation for the keep alive signal may not be as dense as CSI-RS on the Uu link in both time and frequency. For example, the keep alive signal may only span a portion of a bandwidth that a CSI-RS uses, and may be transmitted less often than the periodicity at which CSI-RS is typically transmitted. The sequence associated with the keep alive signal may indicate an identifier (ID) of the Tx UE, allowing the Rx UE to know which UE is sending the keep alive signal.

In certain aspects, the keep alive signal may be transmitted using a wide-band (e.g., 1 component carrier (CC) bandwidth (BW)) due to a frequency selective SL channel. The density in frequency domain may be lower than CSI-RS. In other words, a portion of a BW of a channel may be used for some SL communications, and if the keep alive signal is not wide-band (e.g., in narrow band), it may not indicate whether the quality of the channel in a band of interest for communication is above the threshold.

As described herein, the keep alive signal may include a known sequence that uniquely identifies one SL TX UE, and may be used by the TX UE to send keep alive signaling to all other UE(s) that the TX UE communicates with. For a given SL UE pair (e.g., UE A and UE B), both UEs may send keep alive signals to each other allowing both UEs to track whether the other is within communication range. For example, at one time, UE A may transmit a keep alive signal to UE B, and at another time, UE B may transmit a keep alive signal to UE A. However, in some cases, a UE may forgo transmission of a keep alive signal. For example, as illustrated in FIG. 7B, the Rx UE 704 may detect that the Tx UE 702 is out of range based on the keep alive signaling 706. If the Rx UE 704 is only in communication with the Tx UE 702, then the Rx UE 704 does not send other keep alive signaling 708 to the Tx UE 702 (now an Rx UE with respect to the keep alive signaling 708). In other words, the Rx UE 704 forgoes the transmission of the keep alive signaling 708. However, as illustrated in FIG. 7C, if the Rx UE 704 is also in communication with another Rx UE 710 (or one or more other UEs not shown) and at least one of the Rx UE 704 or the Rx UE 710 is configured with DRX, then the Rx UE 704 transmits the other keep alive signaling regardless of whether the Tx UE 702 is out of range.

The aspects of the present disclosure have provided techniques for determining whether UEs in SL communication are within range of each other when DRX configuration is applied. The keep alive signaling may not be transmitted if DRX configuration is not applied because in such a case, a channel is closely and frequently monitored for channel state information (e.g., for MCS determination). In other words, keep alive signaling may be communicated by two communicating UEs if at least one of the two communicating UEs has DRX configured. If neither of the two communicating UEs have DRX configured, the keep alive signaling is not communicated by the UEs. For instance, assume UE1 is in communication with UE2, UE3 and UE4. Moreover, UE1 and UE2 have no DRX configured, and UE3 and UE4 have DRX configured. UE1 may transmit periodic keep alive signaling during a configured time and frequency resource. The keep alive signaling may reach UE2, UE3, UE4, but will be processed by UE3 and UE4 that have DRX configured. UE2 may not transmit periodic keep alive signaling if UE2 only communicates with UE1. UE3 and UE4 may send periodic keep alive signaling as they are configured with DRX.

Figure 8:
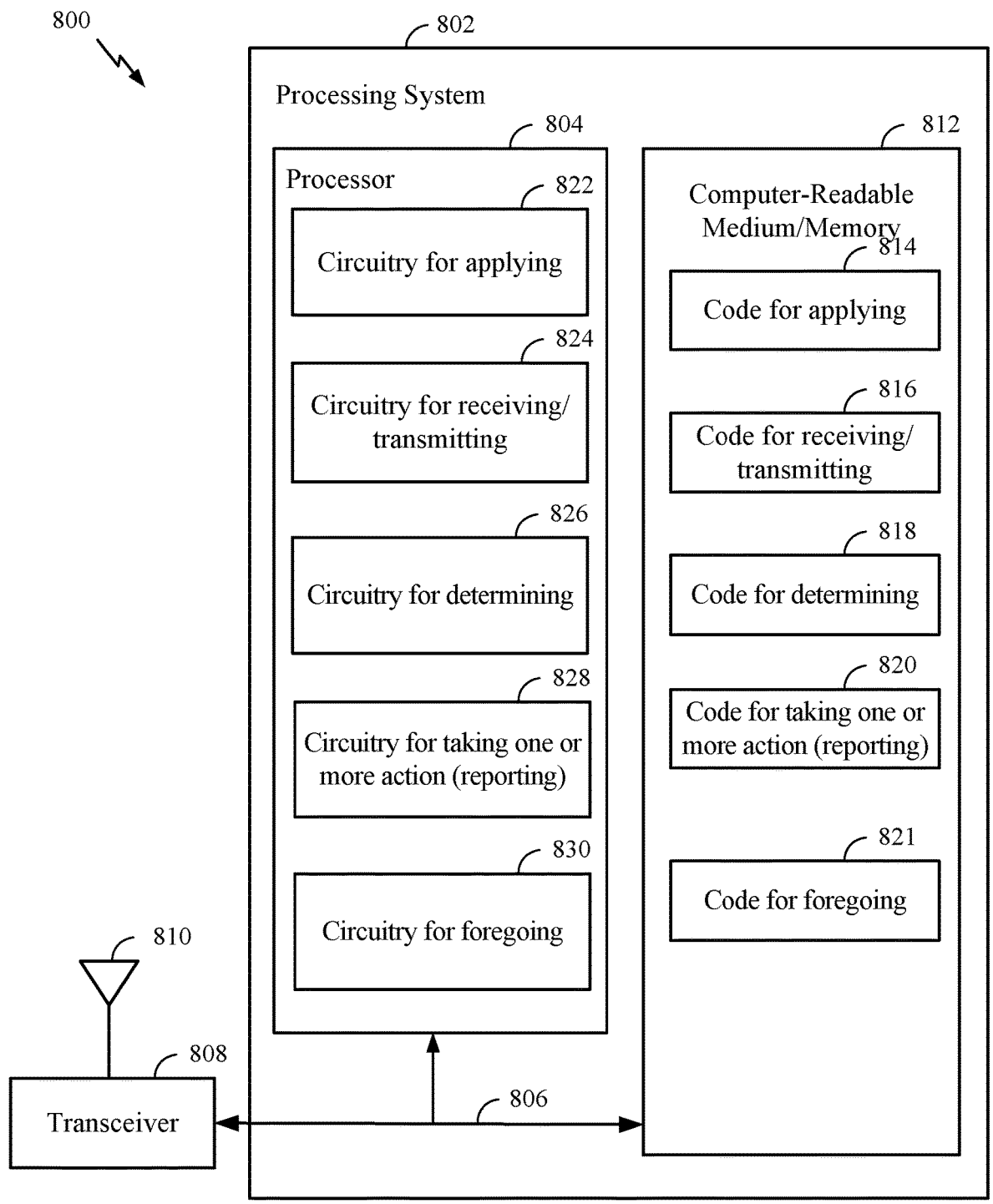
FIG. 8 illustrates a communications device that may include various components configured to perform operations for the techniques disclosed herein.

FIG. 8 illustrates a communications device 800 that may include various components (e.g., corresponding to means-plus-function components) configured to perform operations for the techniques disclosed herein, such as the operations illustrated in FIGS. 5 and 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 5 and 6. In certain aspects, computer-readable medium/memory 812 stores code 814 for applying; code 816 for receiving/transmitting, code 818 for determining, code 820 for taking one or more actions (e.g., reporting), code 821 for foregoing. In certain aspects, the processor 804 has circuitry configured to implement the code stored in the computer-readable medium/memory 812. The processor 804 includes circuitry 822 for applying; circuitry 824 for receiving/transmitting; circuitry 826 for determining; circuitry 828 for taking one or more actions (e.g., reporting); and circuitry 830 for foregoing.

Example Aspects

Aspect 1. A method for wireless communication by a first user-equipment (UE), comprising: monitoring for signaling from a second UE during a discontinuous reception (DRX) cycle associated with a DRX configuration of at least one of the first UE or the second UE; determining whether the first UE and the second UE are within range for communication based on the monitoring; and taking one or more actions based on the determination.

Aspect 2. The method of aspect 1, wherein the one or more actions comprise reporting to a base station that the first UE and the second UE are not within the range for communication if the signaling is not received successfully.

Aspect 3. The method of aspect 2, wherein the signaling is not received successfully if an energy level associated with the signaling is below a threshold.

Aspect 4. The method of any one of aspects 1-3, wherein the signaling is monitored for if the DRX configuration is configured for the at least one of the first UE or the second UE.

Aspect 5. The method of any one of aspects 1-4, wherein the signaling is transmitted by the second UE during multiple periodic transmission occasions, the method further comprising selecting how often to monitor for the signaling, the signaling being monitored for during one or more of the multiple periodic transmission occasions in accordance with the selection.

Aspect 6. The method of aspect 5, wherein the selection of how often to monitor for the signaling is based on an energy level associated with reception of the signaling during one of the multiple periodic transmission occasions.

Aspect 7. The method of any one of aspects 1-6, wherein the signaling is transmitted during multiple periodic transmission occasions, the periodic transmission occasions occurring less often than transmission occasions for synchronization signal blocks (SSBs) or channel state information (CSI)-reference signal (RS).

Aspect 8. The method of any one of aspects 1-7, wherein the signaling includes less information than a SSB or a CSI-RS.

Aspect 9. The method of any one of aspects 1-8, further comprising: determining a resource for transmission of other signaling to be used by the second UE to determine whether the first UE and the second UE are within communication range; and forgoing the transmission of the other signaling if the signaling from the second UE is not received successfully at the first UE.

Aspect 10. The method of any one of aspects 1-9, wherein the signaling from the second UE is not received successfully at the first UE, the method further comprising: determining a resource for transmission of other signaling; and transmitting the other signaling if the first UE is in communication with a third UE, the other signaling to be used by the third UE to determine whether the first UE and the third UE are within communication range.

Aspect 11. The method of any one of aspects 1-10, wherein the signaling comprises a sequence identifying the second UE.

Aspect 12. A method for wireless communication by a first user-equipment (UE), comprising: generating signaling to be used for determination of whether the first UE and a second UE are within range for communication; and transmitting the signaling to the second UE during a discontinuous reception (DRX) cycle associated with a DRX configuration of at least one of the first UE or the second UE.

Aspect 13. The method of aspect 12, further comprising determining whether to transmit the signaling using a wideband or narrow band based on a configuration associated with the communication.

Aspect 14. The method of any one of aspects 12-13, further comprising determining whether to transmit the signaling using a broad beam or narrow beam based on a configuration associated with the communication.

Aspect 15. The method of aspect 14, wherein the configuration associated with the communication comprises at least one of an application type associated with the communication, or a location of the first UE or the second UE.

Aspect 16. The method of any one of aspects 12-15, wherein the signaling is transmitted if the DRX configuration is configured for the at least one of the first UE or the second UE.

Aspect 17. The method of any one of aspects 12-16, wherein the signaling is transmitted during multiple transmission occasions in accordance with a configured periodicity.

Aspect 18. The method of any one of aspects 12-17, wherein the signaling is transmitted during multiple periodic transmission occasions, the periodic transmission occasions occurring less often than transmission occasions for synchronization signal blocks (SSBs) or channel state information (CSI)-reference signal (RS).

Aspect 19. The method of any one of aspects 12-18, wherein the signaling includes less information than a SSB or a CSI-RS.

Aspect 20. The method of any one of aspects 12-19, wherein the signaling comprises a sequence identifying the first UE.

Aspect 21. An apparatus comprising means for performing the method of any of aspects 1 through 20.

Aspect 22. An apparatus comprising at least one processor and a memory coupled to the at least one processor, the memory and the at least one processor being configured to perform the method of any of aspects 1 through 20.

Aspect 23. A computer readable medium storing computer executable code thereon for wireless communications that, when executed by at least one processor, cause an apparatus to perform the method of any of aspects 1 through 20.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first user-equipment (UE), comprising:
 memory; and
 one or more processors coupled to the memory, the one or more processors being configured, individually or collectively, to:
  select how often to monitor for signaling during one or more of multiple periodic transmission occasions, wherein the selection of how often to monitor for the signaling is based on an energy level associated with reception of the signaling during one of the multiple periodic transmission occasions;
  monitor for the signaling from a second UE during a discontinuous reception (DRX) cycle associated with a DRX configuration of at least one of the first UE or the second UE;
  determine whether the first UE and the second UE are within range for communication based on the monitoring; and
  take one or more actions based on the determination, wherein the one or more actions comprise reporting to a network entity that the first UE and the second UE are not within the range for communication if the signaling is not received successfully.

2. The first UE of claim 1, wherein the signaling is not received successfully if an energy level associated with the signaling is below a threshold.

3. The first UE of claim 1, wherein the signaling is monitored if the DRX configuration is configured for the at least one of the first UE or the second UE.

4. The first UE of claim 1, wherein the signaling is transmitted by the second UE during the multiple periodic transmission occasions.

5. The first UE of claim 1, wherein the signaling is transmitted during the multiple periodic transmission occasions, the periodic transmission occasions occurring less often than transmission occasions for synchronization signal blocks (SSBs) or channel state information (CSI)-reference signal (RS).

6. The first UE of claim 1, wherein the signaling includes less information than a synchronization signal block (SSB) or a channel state information (CSI)-reference signal (RS).

7. The first UE of claim 1, wherein the one or more processors are further configured, individually or collectively, to:
 determine a resource for transmission of other signaling to be used by the second UE to determine whether the first UE and the second UE are within communication range; and
 forgo the transmission of the other signaling if the signaling from the second UE is not received successfully at the first UE.

8. The first UE of claim 1, wherein the signaling from the second UE is not received successfully at the first UE, and wherein the one or more processors are further configured, individually or collectively, to:
 determine a resource for transmission of other signaling; and
 transmit the other signaling if the first UE is in communication with a third UE, the other signaling to be used by the third UE to determine whether the first UE and the third UE are within communication range.

9. The first UE of claim 1, wherein the signaling comprises a sequence identifying the second UE.

10. A method for wireless communication by a first user-equipment (UE), comprising:
 selecting how often to monitor for signaling during one or more of multiple periodic transmission occasions, wherein the selection of how often to monitor for the signaling is based on an energy level associated with reception of the signaling during one of the multiple periodic transmission occasions;
 monitoring for the signaling from a second UE during a discontinuous reception (DRX) cycle associated with a DRX configuration of at least one of the first UE or the second UE;
 determining whether the first UE and the second UE are within range for communication based on the monitoring; and
 taking one or more actions based on the determination, wherein the one or more actions comprise reporting to a network entity that the first UE and the second UE are not within the range for communication if the signaling is not received successfully.

11. The method of claim 10, wherein the signaling is not received successfully if an energy level associated with the signaling is below a threshold.

12. The method of claim 10, wherein the signaling is monitored if the DRX configuration is configured for the at least one of the first UE or the second UE.

13. The method of claim 10, wherein the signaling is transmitted by the second UE during the multiple periodic transmission occasions.

14. The method of claim 10, wherein the signaling is transmitted during the multiple periodic transmission occasions, the periodic transmission occasions occurring less often than transmission occasions for synchronization signal blocks (SSBs) or channel state information (CSI)-reference signal (RS).

15. The method of claim 10, wherein the signaling includes less information than a synchronization signal block (SSB) or a channel state information (CSI)-reference signal (RS).

16. The method of claim 10, further comprising:
   determining a resource for transmission of other signaling to be used by the second UE to determine whether the first UE and the second UE are within communication range; and
   forgoing the transmission of the other signaling if the signaling from the second UE is not received successfully at the first UE.

17. A first user-equipment (UE), comprising:
   means for selecting how often to monitor for signaling during one or more of multiple periodic transmission occasions, wherein the selection of how often to monitor for the signaling is based on an energy level associated with reception of the signaling during one of the multiple periodic transmission occasions;
   means for monitoring for the signaling from a second UE during a discontinuous reception (DRX) cycle associated with a DRX configuration of at least one of the first UE or the second UE;
   means for determining whether the first UE and the second UE are within range for communication based on the monitoring; and
   means for taking one or more actions based on the determination, wherein the one or more actions comprise reporting to a network entity that the first UE and the second UE are not within the range for communication if the signaling is not received successfully.

* * * * *